United States Patent
Baker et al.

(10) Patent No.: US 9,990,515 B2
(45) Date of Patent: Jun. 5, 2018

(54) METHOD OF RE-IDENTIFICATION RISK MEASUREMENT AND SUPPRESSION ON A LONGITUDINAL DATASET

(71) Applicant: Privacy Analytics Inc., Ottawa (CA)

(72) Inventors: Andrew Baker, Alcove (CA); Luk Arbuckle, Ottawa (CA); Khaled El Emam, Ottawa (CA); Ben Eze, Orleans (CA); Stephen Korte, Ottawa (CA); Sean Rose, Ottawa (CA); Cristina Ilie, Ottawa (CA)

(73) Assignee: PRIVACY ANALYTICS INC., Ottawa (CA)

( * ) Notice: Subject to any disclaimer, the term of this patent is extended or adjusted under 35 U.S.C. 154(b) by 111 days.

(21) Appl. No.: 14/954,168

(22) Filed: Nov. 30, 2015

(65) Prior Publication Data

US 2016/0154978 A1 Jun. 2, 2016

Related U.S. Application Data

(60) Provisional application No. 62/085,428, filed on Nov. 28, 2014.

(51) Int. Cl.
*G06F 21/00* (2013.01)
*G06F 21/62* (2013.01)
*G06F 17/30* (2006.01)

(52) U.S. Cl.
CPC .... *G06F 21/6254* (2013.01); *G06F 17/30424* (2013.01); *G06F 17/30598* (2013.01)

(58) Field of Classification Search
CPC ........... G06F 21/6254; G06F 17/30424; G06F 17/30598
See application file for complete search history.

(56) References Cited

U.S. PATENT DOCUMENTS

| | | | | |
|---|---|---|---|---|
| 2010/0077006 A1* | 3/2010 | El Emam | .......... | G06F 17/30536 707/785 |
| 2010/0332537 A1* | 12/2010 | El Emam | ............ | G06F 21/6254 707/771 |
| 2014/0189858 A1* | 7/2014 | Chen | ................. | G06F 17/30289 726/22 |

(Continued)

OTHER PUBLICATIONS

Diaz, C. et al., "Information Theory and Anonymity", Proceedings of the 23rd Symposium on Information Theory in the Benelux, Louvain la Neuve, Belgium, (8 pages total) (May 29, 2002).

(Continued)

*Primary Examiner* — Joseph P Hirl
*Assistant Examiner* — Chi Nhuy
(74) *Attorney, Agent, or Firm* — Maldjian Law Group LLC

(57) ABSTRACT

In longitudinal datasets, it is usually unrealistic that an adversary would know the value of every quasi-identifier. De-identifying a dataset under this assumption results in high levels of generalization and suppression as every patient is unique. Adversary power gives an upper bound on the number of values an adversary knows about a patient. Considering all subsets of quasi-identifiers with the size of the adversary power is computationally infeasible. A method is provided to assess re-identification risk by determining a representative risk which can be used as a proxy for the overall risk measurement and enable suppression of identifiable quasi-identifiers.

21 Claims, 6 Drawing Sheets

(56) References Cited

U.S. PATENT DOCUMENTS

2015/0128285 A1    5/2015    Lafever et al.

OTHER PUBLICATIONS

Bezzi, M., "An Entropy based method for measuring anonymity", , Proceedings of the IEEE Third International Conference on Security and Privacy in Communications Networks and the Workshops, SecureComm 2007, Nice, France, (5 pages, total) (Sep. 17, 2007).

Kounine, A et al., "Assessing Disclosure Risk in Anonymized Datasets", Proceedings of FloCon2008, Savannah, Georgia, USA, (4 pages total) (Jul. 1, 2008).

Serjantov, A et al., "Towards an Information Theoretic Metric for Anonymity", Proceedings of the Second International Workshop on Privacy Enhancing Technologies, PET 2002, San Francisco, CA, USA, (14 pages total) (Apr. 14, 2002).

Diaz, C. et al., "Towards measuring anonymity", Proceedings of the Second International Workshop on Privacy Enhancing Technologies, PET 2002, San Francisco, CA, USA, (15 pages total) (Apr. 14, 2002).

Trabelsi, S. et al., "Data Disclosure Risk Evaluation", Proceedings of the Fourth International Conference on Risks and Security of Internet and Systems (CRiSIS 2009), Toulouse, France, pp. 35-42 (8 pages total) (Oct. 19, 2009).

Toth, G. et al., "Measuring Anonymity Revisited", Proceedings of the Ninth Nordic Workshop on Secure IT, Espoo, Finland, (6 pages total) (Apr. 11, 2004).

Airoldi, E.M. et al., "An entropy approach to disclosure risk assessment: Lessons from real applications and simulated domains", Decision Support Systems, vol. 51, issue 1, pp. 10-20, (11 pages total) (Jan. 4, 2011).

International Search Report and Written Opinion dated Jun. 5, 2016 issued in connection with International Application No. PCT/CA2016/050381 (10 pages total).

\* cited by examiner

METHOD OF RE-IDENTIFICATION RISK MEASUREMENT AND SUPPRESSION ON A LONGITUDINAL DATASET

CROSS-REFERENCE

This application claims priority from U.S. Provisional Application No. 62/085,428 filed Nov. 28, 2014 the entirety of which is hereby incorporated by reference for all purposes.

TECHNICAL FIELD

The present disclosure relates to databases and particularly to systems and methods to protecting privacy by de-identification of personal data stored in the databases.

BACKGROUND

Personal information is being continuously captured in a multitude of electronic databases. Details about health, financial status and buying habits are stored in databases managed by public and private sector organizations. These databases contain information about millions of people, which can provide valuable research, epidemiologic and business insight. For example, examining a drugstore chain's prescriptions can indicate where a flu outbreak is occurring. To extract or maximize the value contained in these databases, data custodians must often provide outside organizations access to their data. In order to protect the privacy of the people whose data is being analyzed, a data custodian will "de-identify" or "anonymize" information before releasing it to a third-party. An important type of de-identification ensures that data cannot be traced to the person about whom it pertains, this protects against 'identity disclosure'.

When de-identifying records, many people assume that removing names and addresses (direct identifiers) is sufficient to protect the privacy of the persons whose data is being released. The problem of de-identification involves those personal details that are not obviously identifying. These personal details, known as quasi-identifiers, include the person's age, sex, postal code, profession, ethnic origin and income, financial transactions, medical procedures (to name a few). To be able to de-identify data the assessment of the risk of re-identification is required to be determined. Therefore there is a need for improved risk assessment of data sets.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
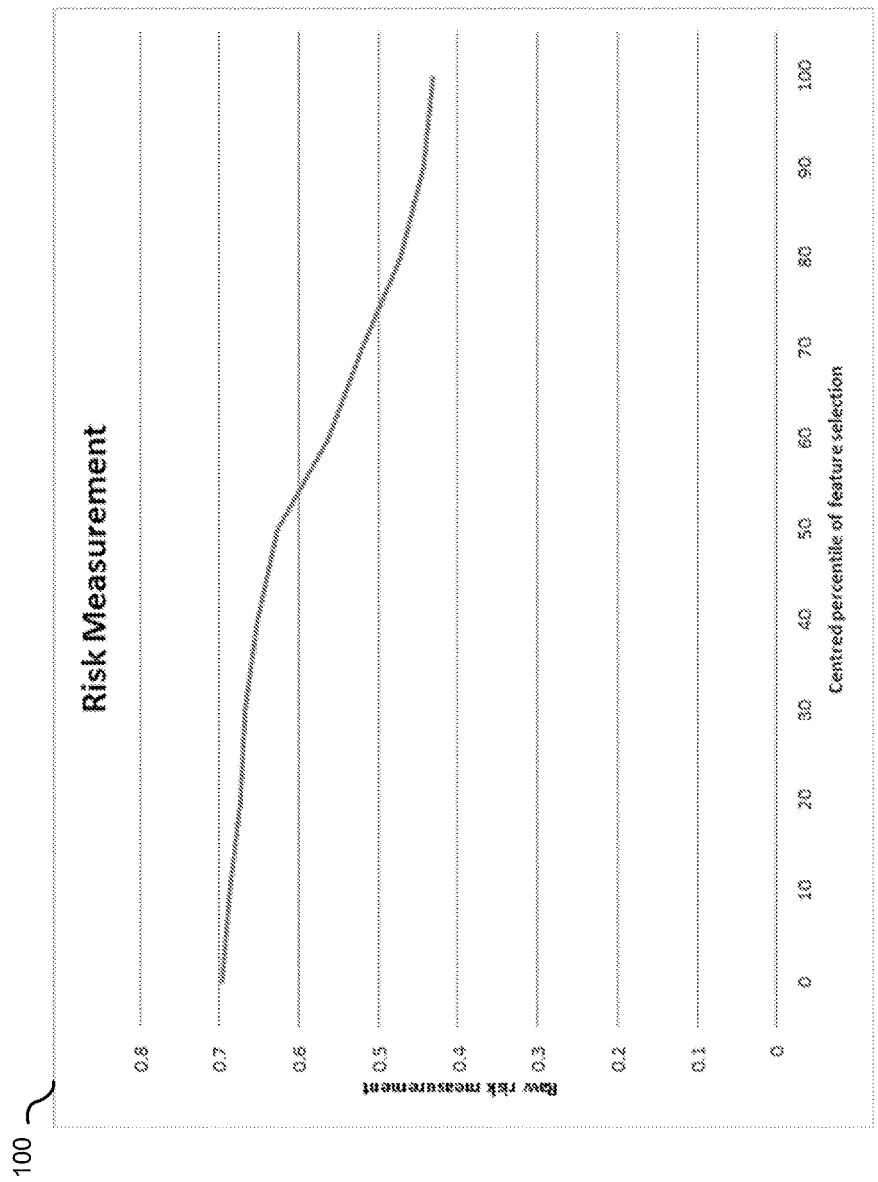
FIG. 1 shows the decreasing risk result as the support of the selected features increase.

Embodiments are described below, by way of example only, with reference to FIGS. 1-6.

In accordance with an aspect of the present disclosure there is provided a computer implemented method of re-identification risk measurement of a dataset, the method comprising: retrieving the dataset comprising personally identifiable information for a plurality of individuals, each individual having cross-sectional (L1) data defining identifiable information and one or more entries of longitudinal (L2) data associated with the L1 data; reducing multiple occurrences for the same individual of the same L2 data to a single feature with an addition of a count; grouping individuals in L1 equivalence classes based on L1 data quasi-identifiers; ordering the features from most to least identifying within each L1 equivalence class; subsampling multiple features for each individual; determining a similarity measure by counting the individuals in the L1 equivalence class who's features comprise a superset of the subsampled features for the current individual; combining multiple similarity measures into a single measure per individual; and determining an overall risk measurement from the combined similarity measures.

In accordance with another aspect of the present disclosure there is provided a non-transitory computer readable memory containing instructions for perform re-identification risk measurement on a dataset, the memory containing instructions which when executed by a processor, cause the processor to perform the method of: retrieving the dataset comprising personally identifiable information for a plurality of individuals, each individual having cross-sectional (L1) data defining identifiable information and one or more entries of longitudinal (L2) data associated with the L1 data; reducing multiple occurrences for the same individual of the same L2 data to a single feature with an addition of a count; grouping individuals in L1 equivalence classes based on L1 data quasi-identifiers; ordering the features from most to least identifying within each L1 equivalence class; subsampling multiple features for each individual; obtaining a similarity measure by counting the individuals in the L1 equivalence class who's features comprise a superset of the subsampled features for the current individual; combining multiple similarity measures into a single measure per individual; and determining an overall risk measurement from the combined similarity measures.

In accordance with still yet another aspect of the present disclosure there is provided a computing device comprising: a memory containing instructions for performing re-identification risk measurement of a dataset comprising personally identifiable information for a plurality of individuals, each individual having cross-sectional (L1) data defining identifiable information and one or more entries of longitudinal (L2) data associated with the L1 data; and a processor coupled to the memory, the processor configured to perform: reducing multiple occurrences for the same individual of the same L2 data to a single feature with an addition of a count; grouping individuals in L1 equivalence classes based on L1 data quasi-identifiers; ordering the features from most to least identifying within each L1 equivalence class; subsampling multiple features for each individual; obtaining a similarity measure by counting the individuals in the L1 equivalence class who's features comprise a superset of the subsampled features for the current individual; combining multiple similarity measures into a single measure per individual; and determining an overall risk measurement from the combined similarity measures.

Databases or datasets generated therefrom that contain personally identifiable information such as those used in medical and financial information can comprises a cross-sectional data (L1) in addition to longitudinal data (L2). Cross-sectional data consists of a single record for each subject. A dataset is longitudinal if it contains multiple records related to each subject and the number of records may vary subject to subject. For example, part of a longitudinal dataset could contain specific patients and their medical results over a period of years. Each patient may have varying times and number of visits. In general a patient will only have a single gender, birthday, or ethnicity, which is consistent throughout his/her life. Longitudinal data are those values which exist and unknown number of times per patient. A patient may only receive a single diagnosis, or may be diagnosed with multiple different diseases. Some patients may not have any values for some longitudinal quasi-identifiers (QIs). An L2 group refers generically to a set of values drawn from one or more longitudinal tables which can be relationally linked together. A dataset may have more than one L2 group which cannot be interconnected.

Such datasets are valuable in research and analytics, however the use of the datasets can provide an opportunity for attackers to determine personally identifiable information resulting in a data breach. In medical databases a patient can have multiple events based upon for example diagnoses, procedures, or medical visits defining L2 data, however it would be overly paranoid to assume that an adversary knows all of these things. The power of the adversary reflects the number of quasi-identifiers or visits that the adversary would have background information about. The power of the adversary is denoted as AdversaryPower. Attacks on cross-sectional datasets usually consist of comparing the differences among the patients or subjects. In a cross-sectional data set, the value AdversaryPower would be the number of quasi-identifier that the adversary has background knowledge of, where AdversaryPower is a number no larger than the number of quasi-identifier in the data set. In the case of longitudinal data (L2), the value AdversaryPower indicates the number of visits about which the adversary would have background information that can be used for an attack.

It is computationally infeasible to consider all possible combinations of AdversaryPower values for a quasi-identifier. Therefore a heuristic is provided which reproducibly chooses a set of values to obtain an average risk which acts as a heuristic for the overall risk measurement across all possible combinations.

A system and method for a new longitudinal risk measurement with adversary power is provided that also incorporates the concepts of date-linked knowledge and count matching.

Date-linked Knowledge

The current models of adversary knowledge are complete and approximate knowledge. Under complete knowledge, the adversary knows the values of every quasi-identifier in every claim and how the values are associated. Under approximate knowledge, the adversary still knows the values of every quasi-identifier, but it is assumed that the adversary does not know how the values are combined into claims. For example, under an approximate knowledge model, a patient who had the flu in January and broke her leg in March would have the same profile as a patient who broke her leg in January and got the flu in March, everything else being equal. This makes for a very powerful adversary, and very high levels of suppression need to be done to manage this risk.

Latanya Sweeney, "Matching Known Patients to Health Records in Washington State Data," Harvard University. Data Privacy Lab, 2013 demonstrated vulnerabilities in the Washington State Inpatient Database (SID) dataset, identifying patient records by matching them against news stories. A news article would name a person, gives some basic demographic information, and describes the event which sent him to hospital. She would then search the SID for a patient who matches this news story. This allowed her to link other events in that patient record with the individual identified in the news article. This type of attack is accounted for under complete knowledge and date-linked knowledge, but a dataset protected under approximate knowledge may still be vulnerable to this type of attack.

Range-based Counting

A specific event or date-event pair may occur multiple times in a dataset associated with a single patient. Because of this, there may be multiple times that each date-event pair occurs for a patient. This may be because a patient has had multiple instances of an event within that timeframe (such as getting the flu twice in a quarter), or may be indicative of the severity of a condition (for example, if there are 10 claims related to a specific diagnosis rather than the usual 3). It can be considered that the approximate number of times that a date-event pair occurs for a patient may be knowable, but that the exact number is unlikely to be known. For example, an adversary may know someone received morphine for his kidney stone, but would not know how many doses he received. This leads to the concept of ranged-based count matching. A set of ranges are defined and take any counts which are within the same range to be indistinguishable. That is, when working with a range set of $\{[0], [1 \ldots 5], [6 \ldots 10], [11+]\}$ there is no effective difference between a patient with a count of 4 for an event-date pair and a patient with a count of 2 for that same pair. Conversely, these patients both look different from a patient with a count of 6.

The ranges are selected to be non-overlapping and exhaustive—every possible count falls into exactly one range. Zero is always its own range. Ranges are then indexed in increasing order, so 0 corresponds with [0], 1 with $[1 \ldots x]$, 2 with $[x+1 \ldots y]$ and so on. Therefore, for the sake of simplicity, exactly counts and the corresponding indices can be used interchangeably in discussing the following methodology in most situations.

Risk Measurement

Figure 2:
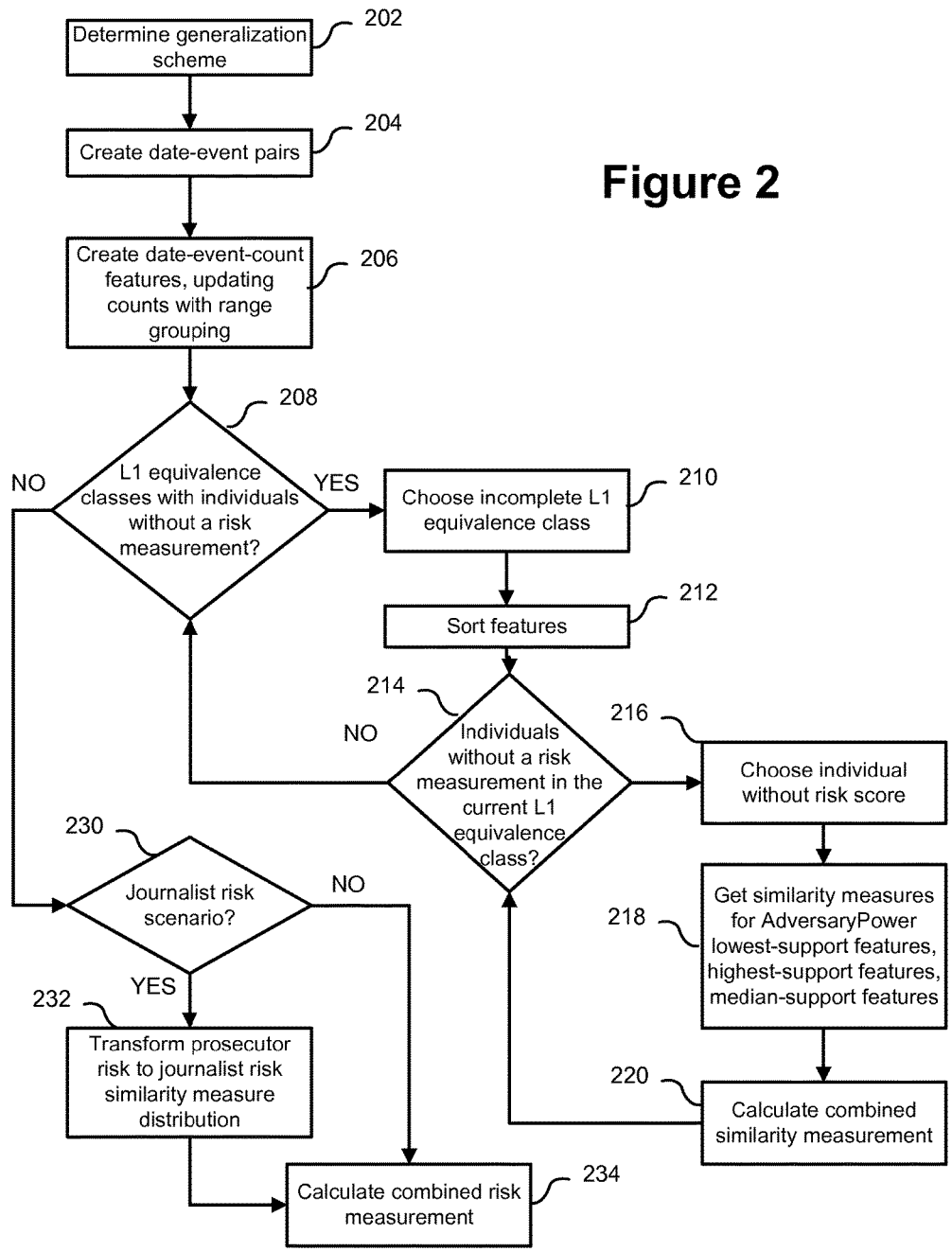
FIG. 2 shows a method of measuring risk on longitudinal data.

Referring to FIG. 2, the combination of the event, date, and count, when taken together, are termed a feature. The event and date are both generalized according to the generalization scheme for the dataset and the count is mapped to a count range set and given by the corresponding index. The generalization scheme may be chosen manually or automatically (202) generated by optimal lattice anonymization (OLA) as shown in for example U.S. Pat. No. 8,326,849, the entirety of which is here by incorporated for all purposes. The sum of information available for a given patient is given by the cross-sectional (L1) values associated with that patient, and a list of L2 features.

Patients are first clustered according to their cross-sectional (L1) quasi-identifier values, forming L1 equivalence classes. Within each L1 equivalence class the features are ordered based on their support. The support of a given feature is given by the number of patients in that L1 equivalence class who share that feature.

For each patient, features are selected from the sorted list in order to approximate an average risk scenario. Since it is computationally infeasible to consider every combination of AdversaryPower claims a representative sample is chosen by measuring the risk of the most identifying features, least identifying features, and median identifying features for each individual. FIG. 1 shows a graph 100 illustrating the decreasing risk as the chosen features become more common.

The longitudinal (L2) data is grouped by date-event pairs (204). A separate sorted feature list is created for each L2 quasi-identifier in the current L2 group (206). The lists are sorted, and the features chosen, independently from each other. For example, a dataset may contain 3 cross-sectional (L1) quasi-identifiers and 2 longitudinal (L2) quasi-identifiers in the current L2 group. The combined patient profile consists of the 3 L1 QI values, AdversaryPower features from the first L2 QI, and AdversaryPower features from the second L2 QI.

For each combination of features selected, the patients in the L1 equivalence class are searched to determine the number of patients who contain this combination of features as a subset of their claims. The feature in the current patient is a considered to be matched by a feature in another candidate if the date and event match exactly and the count of that candidate's feature is at least as large as the count in the current patient's feature.

In the following example, the tuples are listed in order of increasing support. It is assumed AdversaryPower=3 and the case of the three most identifying features are only considered for the sake of simplicity.

| Patient | Current | A | B | C | D |
|---|---|---|---|---|---|
| L1 | | | | | |
| Gender | Male | Male | Male | Female | Male |
| Year of Birth | 1983 | 1983 | 1983 | 1983 | 1983 |
| L2 | | | | | |
| (123, Jan., 2) | No | No | Yes | No | No |
| (234, Jan., 1) | Yes (in profile) | Yes | Yes | Yes | Yes |
| (345, Feb., 1) | Yes (in profile) | Yes | Yes | Yes | No |
| (456, Jun., 4) | Yes (in profile) | Yes | Yes | Yes | Yes |
| (567, Apr., 1) | Yes (not in profile) | No | No | No | No |

Patient A is a match to the current patient, having the same L1 values and every L2 feature which has been selected in the current patient profile. It does not matter that patient A does not have the feature (567, April, 1), because it was not selected in the current combination of features.

Patient B is also a match to the current patient. Again, the L1 values match and B has all the features that the current patient has. Patient B also has a feature with lower support that the current patient does not have, but this presence does not impact the match.

Patient C is not a match to the current patient. Patient C is female, while the current patient is male. The mismatch in the L1 data prevents a match from being scored. It does not matter that patient C matches on the L2 features.

Patient D is also not a match to the current patient. While the L1 fields are a match, patient D does not have feature (345, February, 1), which was selected as a part of the patient profile for the current patient.

If there are L1 equivalence classes with individuals without a risk measurement (YES at 208), an incomplete L1 equivalence class is selected (210). The features are sorted (212) by support. If there are no individuals without a risk measurement in the current L1 equivalence class (NO at 214) it is determined if there remain L1 equivalence classes with individual without a risk measurement. If there are individual without a risk measurement (YES at 214) the individuals are selected (216) and similarity measures for AdversaryPower lowest-support features, highest-support features, median-support features are determined (218). A combined similarity measure can then be determined (220).

The total number of patients in the L1 equivalence class who have the currently chosen features as a subset of their claims is considered the similarity measure for this feature set combination, and the risk on this combination is 1/SimilarityMeasure. The average risk for the patient is given by the average of the three risks calculated based on the three sets of features measured for that patient. If there are no L1 equivalence classes with individuals without a risk measurement (NO at 208) then the risk measures can be determined. Under a prosecutor risk scenario (NO at 230), the dataset average risk is the average of the individual patient risk measurement (234). Under a journalist risk scenario (YES at 230), the patient average risk can be inverted to obtain an estimated average equivalence class size (232). These average equivalence class sizes, aggregated across all patients, may be used to model the expected risk in a larger population as demonstrated in U.S. non-Provisional application Ser. No. 14/953,195 filed Nov. 27, 2015 entitled "Determining Journalist Risk of a Dataset using population equivalence class distribution estimate" the entirety of which is hereby incorporated by reference for all purposes. Alternatively a random subsample of patients can be flagged upon whom the risk measurement will be performed. These patients are compared against the entire dataset for the purposes of determining a similarity measurement. The same similarity measure is obtained for each patient measured whether or not subsampling is applied, but the use of subsampling introduces a confidence interval to the final risk measurement.

The number of patients who are at risk (require some suppression in order to obtain a low risk dataset) is estimated as in a cross-sectional dataset, accounting for the non-symmetry of similarity measures as opposed to equivalence class sizes.

Suppression

In a cross-sectional dataset, suppression can be performed in order to merge small equivalence classes together into larger ones in order to lower the associated risk measurement. Due to the non-symmetry of similarity measures, an analogous approach is not appropriate for longitudinal data with limited adversary power.

Longitudinal suppression with adversary power introduces a new concern referred to as cascading suppression. Because suppression is not a strict merging of equivalence classes, suppression of a feature on one patient may increase the risk on another patient, increasing the risk on a different patient and introducing a need for additional suppression.

The impact of suppression on the cross-sectional (L1) table in a dataset is much higher than the impact of suppression on longitudinal (L2) tables. This is due to the exact matching on every cross-sectional (L1) quasi-identifier whereas longitudinal (L2) quasi-identifiers matching on only a subset, resulting in L2 feature matching occurring within each L1 equivalence class. Separate values are therefore used for the target L1 equivalence class size and minimum support required in tables in the L2 group.

While the target values are separate, in order to maintain good data quality the total amount of suppression is balanced between the L1 table and L2 group tables. This results in an iterative process which converges on a pair of values which balance the suppression.

The balancing method consists of two nested modified binary searches which efficiently converge on a balanced solution. The outer modified binary search controls the search for balanced suppression while the inner modified binary search searches for the least L2 suppression possible in order to obtain a low risk result given the current L1 equivalence class division.

Figure 3:
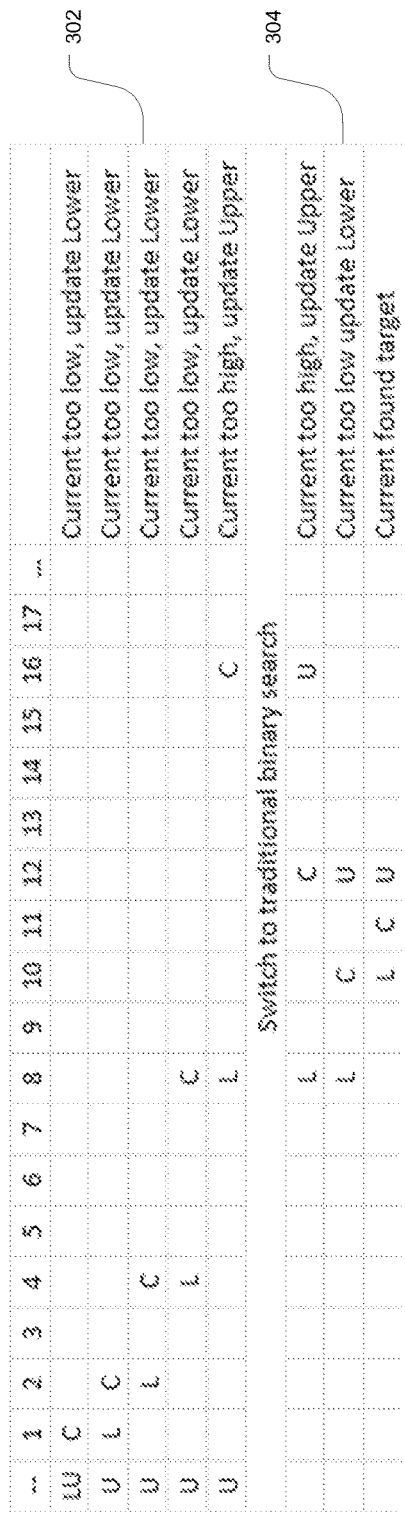
FIG. 3 shows the modified binary search for a sample value of 11.
Figure 4:
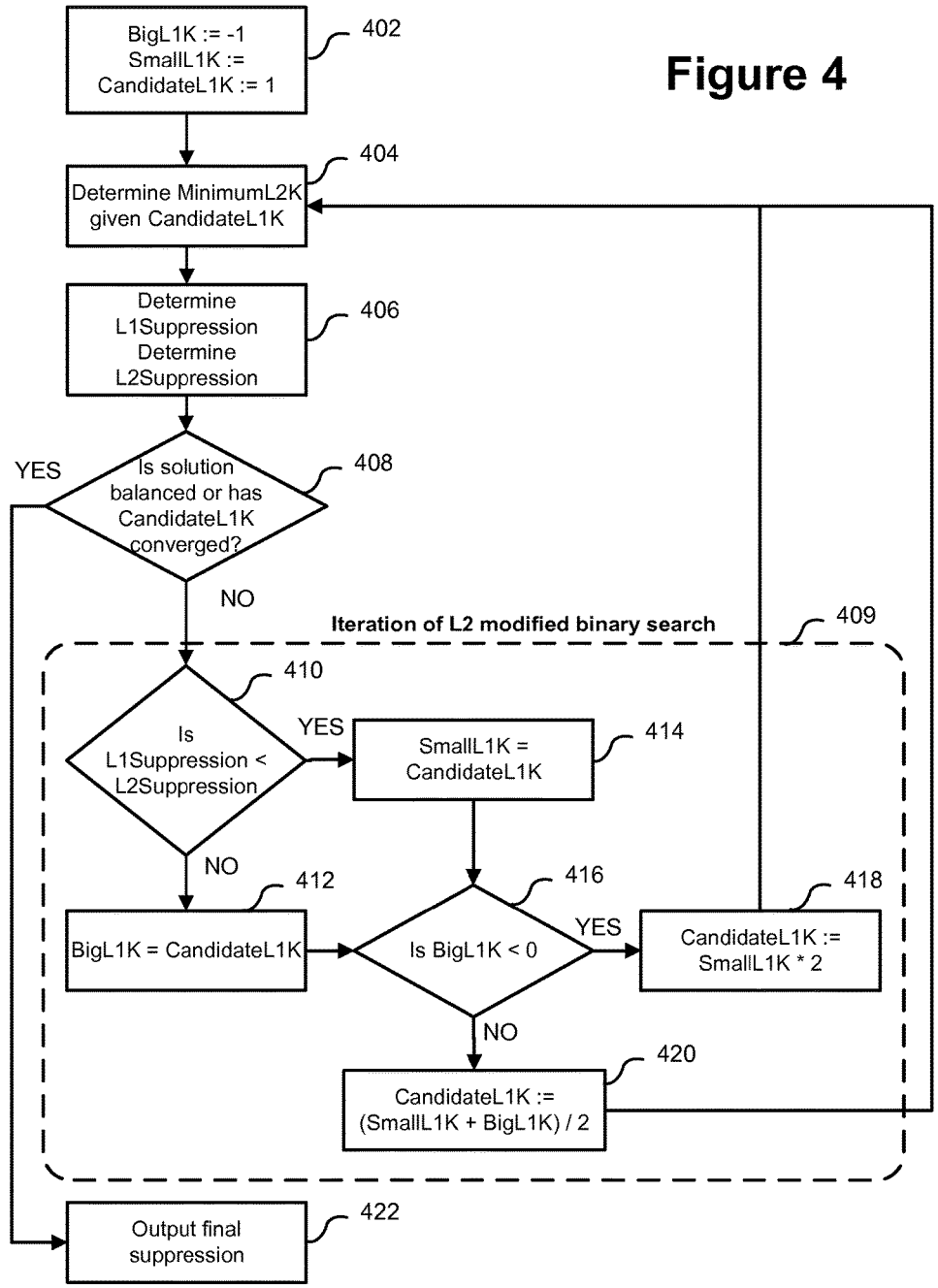
FIG. 4 shows a method of obtaining a low-risk dataset with balanced suppression.

The binary searches are modified in that there is no known upper bound at the start of the process (though the total number of patients in the dataset provides a stopping condition in both cases). The candidate value is initialized to 1. This candidate value is either an acceptable solution or too low. Assuming the latter case, the value is doubled and a new comparison is performed. If it is too low, the test value is doubled again. If it is the solution, the process completes. If it is too high, then a typical binary search runs with upper and lower bound given by the current and previous candidate values respectively. FIG. 3 illustrates a modified binary search for the value 11. The columns indicate the values in a sorted list of integers. Each row corresponds to one step of the refinement process. The positions of the upper bound, lower bound, and current value are indicated by the characters U, L, and C respectively. The first half of the search (302) corresponds to the increase of the candidate value until the target value is surpassed. The second half of the search (304) corresponds to a traditional binary search with upper and lower bounds initialized by the first phase.

Pseudo-code of modified binary search for minimum L2 support value:

```
MaxHighRiskK = 1
MinLowRiskK = -1
While (MaxHighRiskK != MinLowRiskK - 1)
{
   If (MinLowRiskK < 0)
   {
      CandidateK = MaxHighRiskK * 2
   }
   Else
   {
      CandidateK = (MaxHighRiskK + MinLowRiskK) / 2
   }
   Phase 2 suppression with CandidateK on current L2Group
   If (Dataset (+ buffer) is high risk)
   {
      MaxHighRisk = CandidateK
   }
   Else
   {
      MinLowRisk = CandidateK
   }
   Roll back suppression on current L2 group
}
Suppression with MinLowRisk on all L2 groups
```

The L1 k value (minimum L1 equivalence class size) is initially set to the minimum possible value: 1 (402). This requires no suppression on the cross-sectional (L1) table. The minimum L2 support (k) is determined for a given candidate (404). A first check is done to see if any suppression is needed to obtain a low-risk dataset (406). The risk measurement used at this point is the aforementioned risk measurement methodology. If the dataset is already low risk, then the L2 support limit is set to 0. Otherwise the inner modified binary search initiates with the L2 support limit set to 1 and searches for the smallest value for the L2 support limit which yields a low risk solution.

Once a low risk solution is found, the total amount of suppression on the L1 table and L2 tables is compared. If the difference is less than a given bound (5%) the solution is accepted (YES at 408). Otherwise, if the suppression is not balanced and the modified binary search has not converged (NO at 408), one additional step of the modified binary search is performed (409). If the L1 suppression is lower than the L2 suppression (YES at 410), the outer binary search iterates with a larger lower bound on the L1 k value (414), whereas if the L1 suppression is higher than the L2 suppression (NO at 410), the outer binary search iterates with a smaller upper bound on the L1 k value (412). If the upper bound on the L1 value is less than zero (YES at 416) the modified binary search is still in the first phase so the candidate L1 is set equal to double the small L1 value (418). If large L1 value is greater than zero (NO at 416) the candidate L1 is set equal to half of the sum of small L1 and large L1 (420). If the outer binary search converges on a single value with meeting suppression balancing condition (YES at 408), the converged solution is taken as optimal whether or not it is sufficiently balanced (422).

Pseudo-code of suppression methodology:

```
BigL1K = -1
SmallL1K = L2ProcessK
CandidateL1K = SmallL1K
AcceptableSolution = false
do
{
   Determine L1Suppression with CandidateL1K
   Determine the L2Suppression based on the L1 ECs created by CandidateL1K
   if (abs(L1Suppression-L2Suppression) <= 5 || (L1Suppression> L2Suppression && CandidateL1K==L2ProcessK) || (L1Suppression < L2Suppression && L1Missingness == 100))
   {
      AcceptableSolution = true
   }
   else
   {
      if (L2Suppression > L1Suppression)
      {
         SmallL1K = CandidateL1K
      }
      else
      {
         BigL1K = CandidateL1K
      }
      if (BigL1K < 0)   // if the upper bound has not been reached yet
      {
         CandidateL1K = SmallL1K * 2
      }
      else   // close the binary search in on the solution
      {
         CandidateL1K = (SmallL1K + BigL1K) / 2
      }
   }
} while (not AcceptableSolution AND SmallL1K != BigL1K-1 )
if (SmallL1K == BigL1K-1)
{
   CandidateL1K = BigL1K
}
Perform suppression on L1 with CandidateL1K
```

Figure 5:
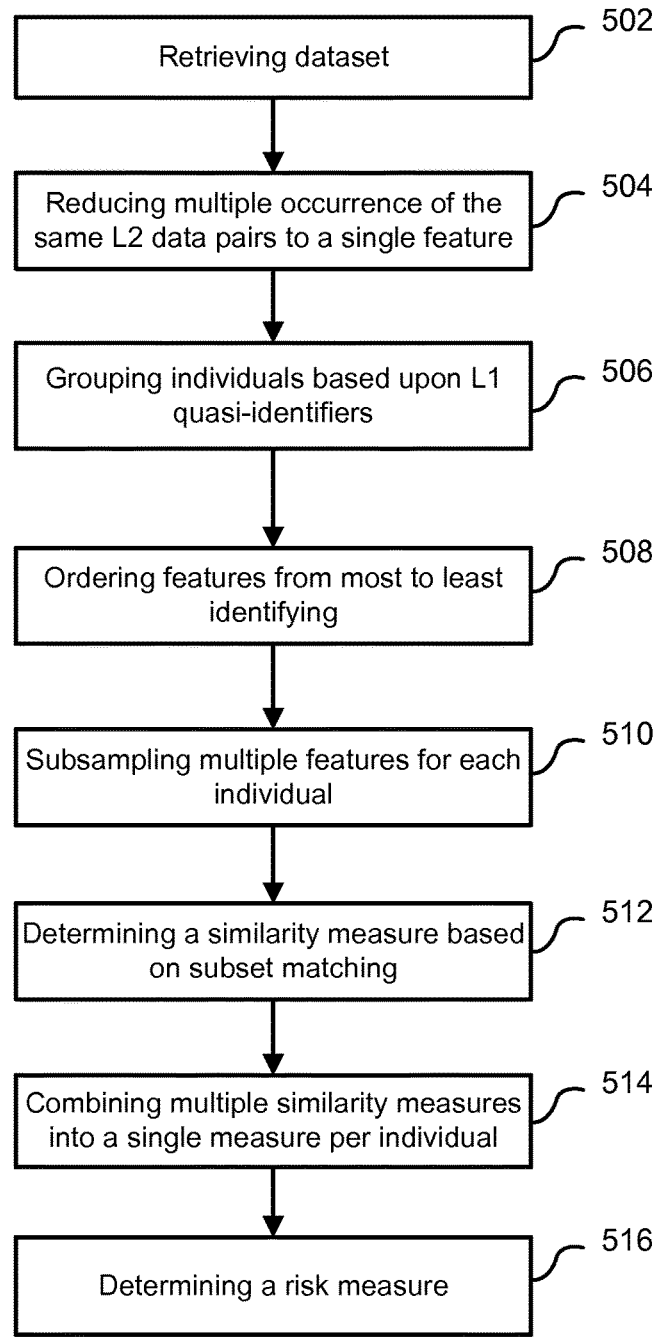
FIG. 5 shows a method of risk measurement and suppression on longitudinal data.

FIG. 5 shows a method of re-identification risk measurement and suppression on longitudinal data. The dataset is retrieved from a memory comprising personally identifiable information for a plurality of individuals, each individual having cross-sectional (L1) data defining identifiable information and one or more entries of longitudinal (L2) data associated with the L1 data (502). Multiple occurrences for the same individual of L2 data are combined to reduce to a single feature with an addition of a count (504). Individuals are grouped in to L1 equivalence classes based on L1 data quasi-identifiers (506). Features from most to least identifying are ordered within each L1 equivalence class (508). Multiple features from the profiles are sub-sampled for each individual (510). A similarity measure is determined by counting the individuals in the L1 equivalence class who's features comprise a superset of the subsampled features for the current individual (512). Multiple similarity measures are combined into a single measure per individual (514). An overall risk measurement is determined (516) from the combined similarity measures. The quasi-identifiers are associated with personally identifiable details and the L2 data is comprises dates and associated events which are linked together. A feature comprises the event, date, and count in the L2 data. The L2 data can be transformed by generating count ranges in place of exact multiplicity counts. The risk measurement can be determined by transforming similarity measures from a prosecutor to journalist risk measurement. Further the risk measurement can be performed upon a sub-sample of individuals in the dataset against the entire dataset.

Reducing the risk of re-identification on of L2 data can comprise suppressing data by iteratively updating the an amount of L1 suppression, at each iteration, minimizing the L2 suppression; and checking if the suppression is balanced or the search has converged. The suppression can be performed by a binary search. The L2 suppression can also be performed by a modified binary search wherein the binary search searches for the smallest value of L2 support limit which yields a low risk measurement.

Figure 6:
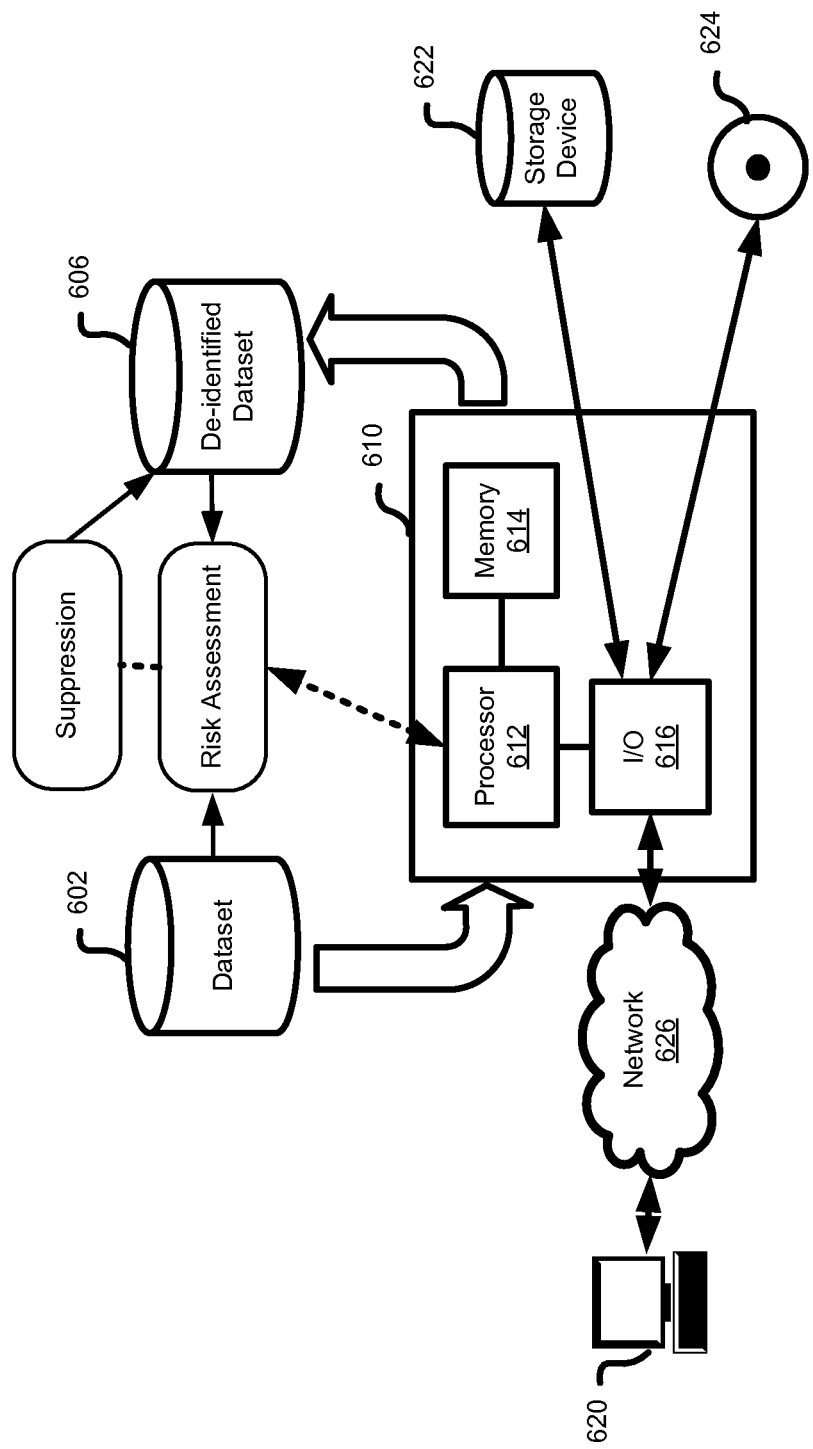
FIG. 6 shows a system for performing risk measurement and suppression on longitudinal data.

FIG. 6 provides a system for risk measurement and suppression on longitudinal data with adversary power in connection with the above described method. A computer or server 610 providing at least a processor 612, memory 614 and input/output interface 616, implements the code for executing the de-identification process. A source dataset 602 is stored on computer readable storage memory which may reside locally or remotely from processing unit 612. The dataset is processed by the computer 610 to provide risk assessment and suppression which can be used for the optimal de-identification. Generalization strategies and levels of suppression can also be provided through template files, user selection or input through interaction with the computer 610, either directly through input devices such a keyboard/mouse and display or remotely through a connected computing network 626. External storage 622, or computer readable memory such as compact disc, digital versatile disc or other removable memory devices 624 may be used to provide the instructions for execution of the risk assessment and de-identification methods or provide input for generalization or suppression parameters via I/O unit 616. Execution of the method on processor 612 retrieves 606 and provides an assessment of risk or provide the resulting parameters which can be utilized in performing de-identification of the dataset to meet a desired risk threshold. The de-identification process may use optimization such as optimal lattice anonymization for determine a level of de-identification which meets desired risk threshold.

Each element in the embodiments of the present disclosure may be implemented as hardware, software/program, or any combination thereof. Software codes, either in its entirety or a part thereof, may be stored in a non-transitory computer readable medium or memory (e.g., as a RAM, ROM, for example a non-volatile memory such as flash memory, CD ROM, DVD ROM, Blu-Ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-6 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims. Although the term patient and claim are utilized in the description, the terms may be used in regards to other type of records, other than medical records such as for example financial records, travel records or any personally identifiable data records and should not be limited to medical records.

The invention claimed is:

1. A computer implemented method of re-identification risk measurement of a dataset, the method comprising:
retrieving, by a server from a database, the dataset comprising personally identifiable information for a plurality of individuals, each individual having cross-sectional (L1) data defining identifiable information and a plurality of entries of longitudinal (L2) data associated with the L1 data;
reducing, by the server for each individual, multiple occurrences of a same L2 data to a single feature with an addition of a count;
grouping, by the sever, the plurality of individuals into L1 equivalence classes based on L1 data quasi-identifiers;
ordering, by the server for individuals within each L1 equivalence class, features of the individuals from most to least identifying;
subsampling, by the server, multiple features for each individual;
determining, by the server, a similarity measure by counting the individuals in the L1 equivalence class whose features comprise a superset of the subsampled features for each individual;
combining, by the server, multiple similarity measures into a single measure per individual; and
determining, by the server, an overall risk measurement from the combined similarity measures.

2. The method of claim 1 wherein the quasi-identifiers are associated with personally identifiable details.

3. The method of claim 1 wherein the L2 data comprises dates and associated events which are linked together.

4. The method of claim 3 wherein an event, date, and count comprise the feature.

5. The method of claim 1 wherein the L2 data is transformed by generating count ranges in place of exact multiplicity counts.

6. The method of claim 1 wherein determining risk measurement comprises transforming similarity measures from a prosecutor to journalist risk measurement.

7. The method of claim 1 wherein risk measurement is performed upon a sub-sample of individuals in the dataset against the entire dataset.

8. The method of claim 1 wherein reducing the risk of re-identification on L2 data comprises suppressing data by:
iteratively updating an amount of L1 suppression;
at each iteration, minimizing L2 suppression; and
checking if the suppression is balanced or the search has converged.

9. The method of claim 8 wherein the L2 suppression is performed by a binary search.

10. The method of claim 9 wherein the L2 suppression is performed by a modified binary search wherein the binary search searches for the smallest value of L2 support limit which yields a low risk measurement.

11. A non-transitory computer readable memory containing instructions for perform re-identification risk measurement on a dataset, the memory containing instructions which when executed by a processor, cause the processor to perform a method of:
retrieving the dataset comprising personally identifiable information for a plurality of individuals, each individual having cross-sectional (L1) data defining identifiable information and a plurality of entries of longitudinal (L2) data associated with the L1 data;
reducing, for each individual, multiple occurrences of a same L2 data to a single feature with an addition of a count;
grouping the plurality of individuals into L1 equivalence classes based on L1 data quasi-identifiers;
ordering, for individuals within each L1 equivalence class, features of the individuals from most to least identifying;
subsampling multiple features for each individual;
obtaining a similarity measure by counting the individuals in the L1 equivalence class whose features comprise a superset of the subsampled features for each individual;
combining multiple similarity measures into a single measure per individual; and
determining an overall risk measurement from the combined similarity measures.

12. The non-transitory computer readable memory of claim 11 wherein the quasi-identifiers are associated with personally identifiable details.

13. The non-transitory computer readable memory of claim 12 wherein the L2 data comprises dates and associated events which are linked together.

14. The non-transitory computer readable memory of claim 13 wherein an event, date, and count comprise the feature.

15. The non-transitory computer readable memory of claim 11 wherein the L2 data is transformed by generating count ranges in place of exact multiplicity counts.

16. The non-transitory computer readable memory of claim 11 wherein determining the risk measurement comprises transforming similarity measures from a prosecutor to journalist risk measurement.

17. The non-transitory computer readable memory of claim 11 wherein risk measurement is performed upon a sub-sample of individuals in the dataset against the entire dataset.

18. The non-transitory computer readable memory of claim 11 wherein reducing the risk of re-identification on L2 data comprises suppressing data by:
iteratively updating an amount of L1 suppression;
at each iteration, minimizing L2 suppression; and
checking if the suppression is balanced or the search has converged.

19. The non-transitory computer readable memory of claim 18 wherein the L2 suppression is performed by a binary search.

20. The non-transitory computer readable memory of claim 19 wherein the L2 suppression is performed by a modified binary search wherein the binary search searches for the smallest value of L2 support limit which yields a low risk measurement.

21. A computing device comprising:
a memory containing instructions for performing re-identification risk measurement of a dataset comprising personally identifiable information for a plurality of individuals, each individual having cross-sectional (L1) data defining identifiable information and a plurality of entries of longitudinal (L2) data associated with the L1 data; and
a processor coupled to the memory, the processor configured to perform:
reducing, for each individual, multiple occurrences of a same L2 data to a single feature with an addition of a count;
grouping the plurality of individuals into L1 equivalence classes based on L1 data quasi-identifiers;
ordering, for individuals within each L1 equivalence class, features of the individuals from most to least identifying;
subsampling multiple features for each individual;
obtaining a similarity measure by counting the individuals in the L1 equivalence class whose features comprise a superset of the subsampled features for each individual;
combining multiple similarity measures into a single measure per individual; and
determining an overall risk measurement from the combined similarity measures.

* * * * *